United States Patent [19]

Nagaoka

[11] Patent Number: 5,000,087
[45] Date of Patent: Mar. 19, 1991

[54] CUTTING APPARATUS FOR STEM AND ROOT OF BULB

[76] Inventor: Tatsuo Nagaoka, Kabushikigaisha Nagaokaseikiseisakusho c/o No. 13-12, Minowacho 2-chome, Kohoku-ku, Yokohama-shi, Kanagawa, Japan

[21] Appl. No.: 553,298

[22] Filed: Jul. 17, 1990

[30] Foreign Application Priority Data

Jan. 23, 1990 [JP] Japan .................................. 65-11882

[51] Int. Cl.⁵ ...................... A23N 15/04; A23N 15/08
[52] U.S. Cl. ........................................ 99/636; 99/491; 99/546
[58] Field of Search ................. 99/516, 491, 546, 549, 99/550, 584, 635, 636, 637, 642, 643; 83/409, 425.2, 435.1, 425.4, 809; 426/482, 483

[56] References Cited

U.S. PATENT DOCUMENTS

| | | | |
|---|---|---|---|
| 3,915,083 | 10/1975 | Spruijt | 99/636 |
| 4,258,618 | 3/1981 | Lawson | 99/643 |
| 4,476,778 | 10/1984 | Clyma | 99/546 |
| 4,602,559 | 7/1986 | Suzuki et al. | 99/584 |
| 4,658,713 | 4/1987 | Nagaoka | 83/409 |
| 4,718,334 | 1/1988 | Nagaoka | 99/636 |
| 4,889,046 | 12/1989 | Cornelissen | 99/636 |

FOREIGN PATENT DOCUMENTS 60-241878 11/1985 Japan .

Primary Examiner—Timothy F. Simone
Attorney, Agent, or Firm—Lowe, Price, LeBlanc, Becker & Shur

[57] ABSTRACT

In a cutting apparatus for a root and a stem of an onion, a plurality of first swing links composed of a plurality of parallel link rods and a plurality of second swing links composed of a plurality of parallel link rods are mounted to a machine frame for vertically angular movement. A first and second supports are mounted respectively to one ends of the respective first swing links and to one ends of the respective second swing links for angular movement. A first and a second cutting edges are provided respectively on the first and second supports in facing relation to each other for angular movement, with cutting planes of the respective first and second cutting edges maintained horizontal. A first and a second guides are arranged respectively at the first and second supports so as to project respectively from front parts of the respective first and second supports. Biasing means is arranged at the second swing links for moving the first and second cutting edges toward each other. A single drive unit is arranged at the machine frame for rotating the first and second cutting edges.

11 Claims, 6 Drawing Sheets

CUTTING APPARATUS FOR STEM AND ROOT OF BULB

BACKGROUND OF THE INVENTION

1. Field of the Invention

The present invention relates to a cutting apparatus for a stalk or stem and a root of a bulb such as an onion, a garlic, a scallion or shallot or the like, in which the stem and the root are cut off simultaneously.

2. Description of the Prior Art

Generally, a bulb such as an onion, a garlic or the like has widely been used habitually as a cooking material. Prior to finely cutting the bulb, however, a stem and a root of the bulb must be cut to peel off an outer cover of the bulb at an outer periphery thereof, which is yellowish brown. If an attempt is made to process a large quantity of bulbs, the processing must rely upon a mechanical technique.

However, the bulbs are irregular or non-uniform in their dimension and configuration, unlike industrial products. Accordingly, if a cutting apparatus is constructed such that the stem and the root of the bulb are cut off with the positions of cutting edges for cutting the stem and root set fixedly, the following problem arises. That is, in the case where the upper and lower portions of the bulb are simultaneously cut off to remove the stem and the root of the bulb at both ends thereof by a single pass into the cutting apparatus, the margins of the respective calyxes of the bulb are taken excessively, depending upon the dimension and configuration of the bulb, so that the effective portion of the bulb suffers a loss or becomes insufficient. Thus, it will be required to again cut off the bulb manually or by a machine.

Particularly, if ones of the bulbs, which are insufficient in cutting-off, are sorted or selected from the bulbs after cutting, there is a fear that effects or advantages due to mechanization of the cutting operation are reduced by half.

Conventionally, the following cutting apparatus for a stem and a root of a bulb has been proposed in Japanese Patent Provisional Publication No. 241878/1985. That is, in the cutting apparatus, a first and a second supports are mounted to a machine frame for vertically angular movement. A first and a second cutters having their respective cutting planes maintained horizontal are rotatably provided in facing relation respectively to the first and second supports. A pair of guide pieces are arranged respectively at the first and second supports so as to project forwardly respectively therefrom.

However, the cutting apparatus disclosed in Japanese Patent Provisional Publication No. 241878/1985 requires a drive unit for rotating the first cutter and a drive unit for rotating the second cutter. Thus, the apparatus becomes large in height as a whole.

SUMMARY OF THE INVENTION

It is therefore an object of the invention to provide a cutting apparatus for a stem and a root of a bulb, in which the bulb is moved longitudinally along a space between a guide of a first support and a guide of a second support, whereby the first support is moved upwardly during movement of the bulb while a plurality of first swing links are moved angularly with respect to a machine frame and, simultaneously, the second support is moved downwardly during the movement of the bulb while a plurality of second swing links are moved angularly with respect to the machine frame, in which a first cutting edge is moved upwardly together with the first support while a cutting plane of the first cutting edge is maintained horizontal, and a second cutting edge is moved downwardly together with the second support while a cutting plane of the second cutting edge is maintained horizontal, in which a single drive unit rotates the first and second cutting edges, in which a drive unit for rotating the first cutting edge and a drive unit for rotating the second cutting edge are unnecessary unlike the conventional cutting apparatus, in which the bulb having the stem and the root which are cut off passes through the space between the first and second cutting edges and, simultaneously, the first and second cutting edges are moved toward each other by biasing means through the first and second swing links, and in which the cutting apparatus can be reduced in height as far as possible as a whole.

DETAILED DESCRIPTION OF THE PREFERRED EMBODIMENTS

Figure 1:
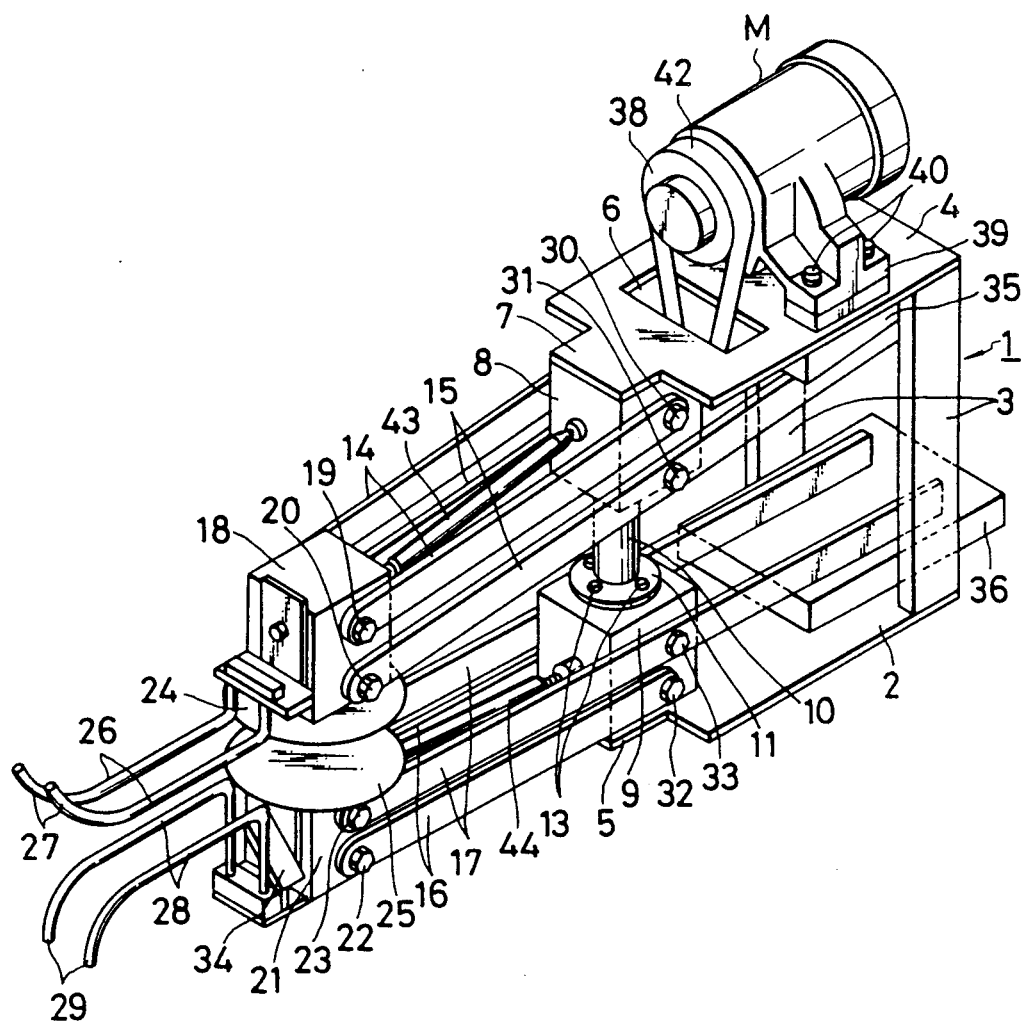
FIG. 1 is a perspective view of an embodiment of a cutting apparatus for a stem and a root of a bulb, according to the invention.

Referring to FIG. 1, there is shown a machine frame 1 having a bottom plate 2. A pair of posts 3 and 3 are mounted respectively to both sides of the bottom plate 2 in an upstanding manner. An upper plate 4 is arranged at upper ends of the respective posts 3 and 3 and extends in parallel relation to the bottom plate 2. The bottom plate 2 has its forward end which is formed with a projection 5 which projects forwardly. A section of the upper plate 4 adjacent the forward end thereof is formed therein with an inserting bore 6. The forward end of the upper plate 4 is provided with a projection 7 which projects forwardly.

Figure 2:
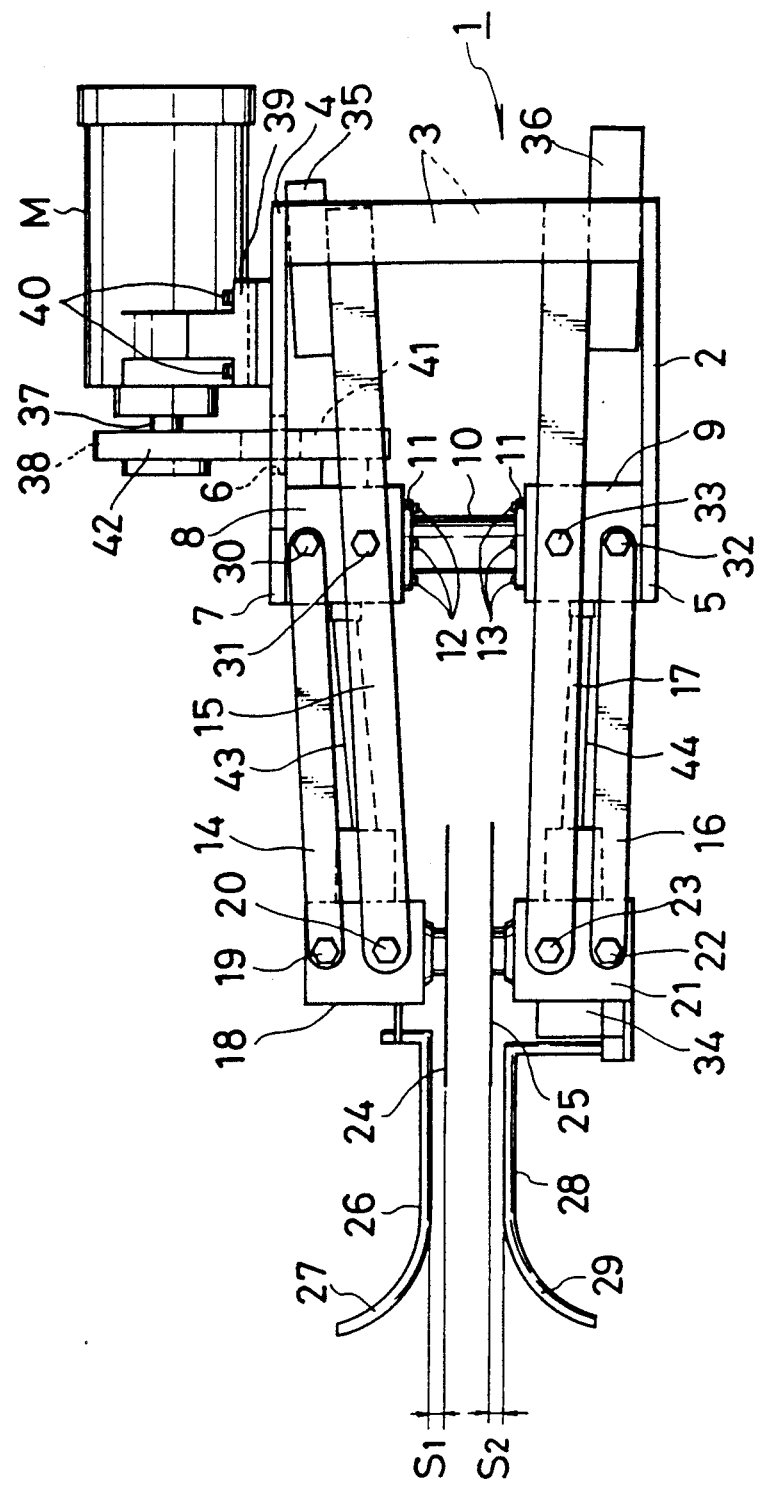
FIG. 2 is a side elevational view of the cutting apparatus illustrated in FIG. 1.

An upper gearbox 8 is mounted on a lower surface of a section of the machine frame 1, which corresponds to the projection 7 of the upper plate 4. A lower gearbox 9 is mounted on an upper surface of a section of the bottom plate 2, which corresponds to the projection 5. As shown in FIG. 2, a support pipe 10 extending vertically is arranged between the upper and lower gearboxes 8 and 9. The support pipe 10 has its upper and lower ends which are formed respectively with a pair of flanges 11 and 11. The flange 11 at the upper end of the support pipe 10 is fixedly mounted to the lower face of the upper gearbox 8 by means of a plurality of bolts 12. The flange 11 at the lower end of the support pipe 10 is fixedly mounted to the upper face of the lower gearbox 9 by means of a plurality of bolts 13.

Two pairs of first swing links 14 and 14 and 15 and 15 are arranged, for vertically angular movement, at the upper gearbox 8 which is mounted to the lower face of the upper plate 4 of the machine body 1. The pairs of first swing links 14 and 14 and 15 and 15 are composed of a plurality of link rods which are different in length from each other and which extend in parallel relation to each other. Two pairs of second swing links 16 and 16 and 17 and 17 are arranged, for vertically angular movement, at the lower gearbox 9 which is mounted to the upper face of the bottom plate 2 of the machine body 1. The second swing links 16 and 16 and 17 and 17 are arranged in facing relation to the pairs of first swing links 14 and 14 and 15 and 15. The pairs of second links 16 and 16 and 17 and 17 are composed of a plurality of link rods which are different in lenght from each other and which extend in parallel relation to each other.

Specifically, the pair of swing links 15 and 15 are arranged below the pair of swing links 14 and 14. The pair of swing links 15 and 15 are longer than the entire lengths of the respective swing links 14 and 14 and extend in parallel relation thereto. The pair of swing links 17 and 17 are arranged above the pair of swing links 16 and 16. The pair of swing links 17 and 17 are longer than the entire lengths of the respective swing links 16 and 16 and extend in parallel relation thereto.

Figure 3:
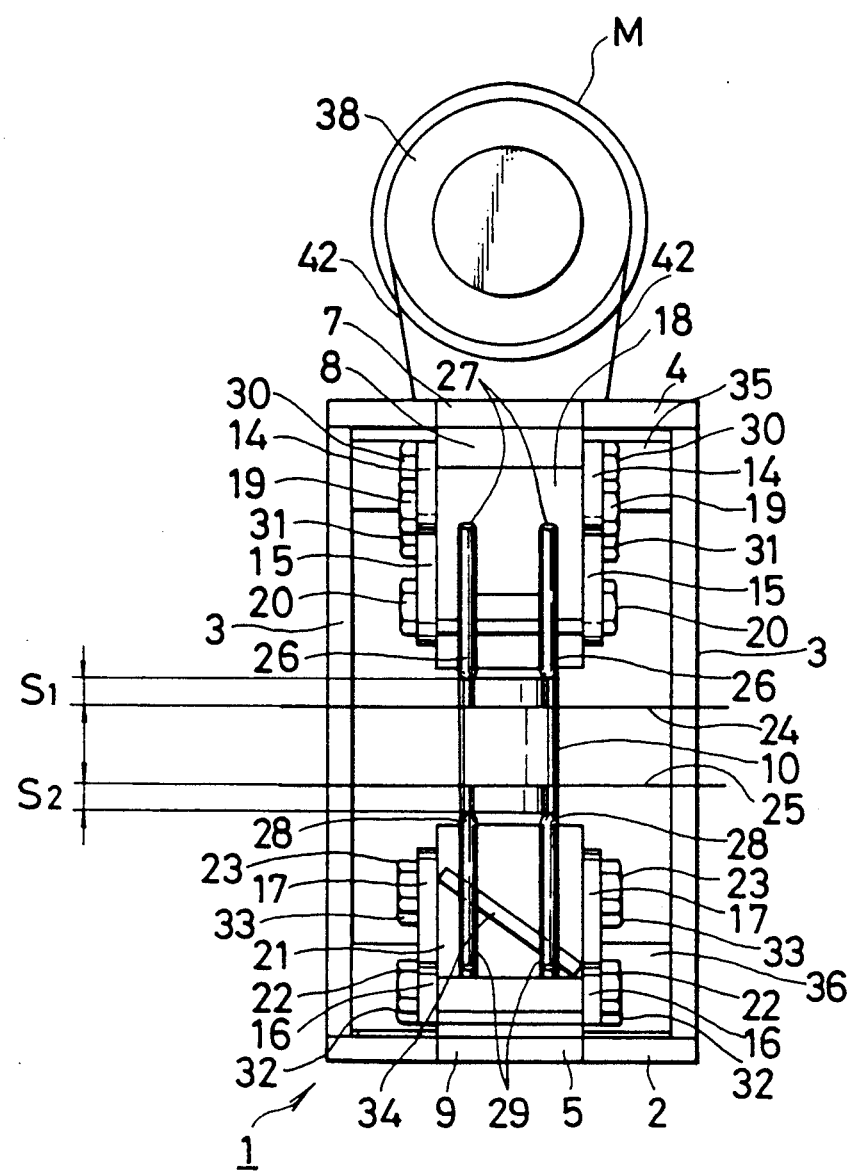
FIG. 3 is an enlarged front elevational view of a principal portion of the embodiment illustrated in FIG. 2.

As shown in FIG. 2, an upper gearbox 18, which serves as a first support, is mounted to one ends of the respective first swing links 14 and 14 and 15 and 15 through pivots 19 and 20 for angular movement thereabout. A lower gearbox 21, which serves as a second support, is mounted to one ends of the respective second swing links 16 and 16 and 17 and 17 through pivots 22 and 23 for angular movement thereabout. As shown in FIG. 3, a disc-like first cutting edge 24 having its cutting plane maintained horizontal is arranged at the lower portion of the upper gearbox 18 for rotation about a vertical axis. A disc-like second cutting edge 25 having its cutting plane maintained horizontal is arranged at the upper portion of the lower gearbox 21 for rotation about the vertical axis, in facing relation to the first cutting edge 24.

A pair of guide rods 26 and 26, which serve respectively as a guide, are arranged at the upper gearbox 18 in parallel relation to each other and project forwardly from the front part of the upper gearbox 18. The guide rods 26 and 26 have their respective forward ends which are formed respectively into a pair of curved sections 27 and 27 extending upwardly. A gap $S_1$ is defined between the first cutting edge 24 and horizontal sections of the respective guide rods 26 and 26, and serves as a predetermined depth of cut.

A pair of guide rods 28 and 28, which serve respectively as a guide, are arranged at the lower gearbox 21 in parallel relation to each other and project forwardly from the front part of the lower gearbox 21. The guide rods 28 and 28 have their respective forward ends which are formed respectively into a pair of curved sections 29 and 29 extending downwardly. A gap $S_2$ is defined between the second cutting edge 25 and horizontal sections of the respective guide rods 28 and 28, and serves as a predetermined depth of cut.

The guide rods 26 and 26 and 28 and 28 are arranged tangentially of an outer peripheral surface of a rotary table of a bulb centering clamp apparatus (not shown). The rotary table is rotatable about a vertical axis.

The first swing links 14 and 14 have their respective one ends which are supported by the upper portion of the outer peripheral surface of the upper gearbox 18 through the pivots 19 for angular movement thereabout. The first swing links 15 and 15 have their respective one ends which are supported by the lower portion of the outer peripheral surface of the upper gearbox 18 through the pivots 20 for angular movement thereabout. The first swing links 14 and 14 have their respective other ends which are supported by the upper portion of the outer peripheral surface of the upper gearbox 8 through pivots 30 for angular movement thereabout. The first swing links 15 and 15 have their respective sections adjacent the longitudinal centers of the respective first swing links 15 and 15. The sections of the respective first swing links 15 and 15 are supported by the lower portion of the outer peripheral surface of the upper gearbox 8 through pivots 31 for angular movement thereabout.

Further, the second swing links 16 and 16 have their respective one ends which are supported by the lower portion of the outer peripheral surface of the lower gearbox 21 through the pivots 22 for angular movement thereabout. The second swing links 17 and 17 have their respective one ends which are supported by the upper portion of the outer peripheral surface of the lower gearbox 21 through the pivots 23 for angular movement thereabout. The second swing links 16 and 16 have their respective other ends which are supported by the lower portion of the outer peripheral surface of the lower gearbox 9 through pivots 32 for angular movement thereabout. The second swing links 17 and 17 have their respective sections adjacent the longitudinal centers of the respective second swing links 17 and 17. The sections of the respective second swing links 17 and 17 are supported by the upper portion of the outer peripheral surface of the lower gearbox 9 through pivots 33 for angular movement thereabout.

An inclined plate 34 is arranged at the front face of the lower gearbox 21.

A weight 35 is mounted to upper faces of the other ends of the respective first swing links 15 and 15. Biasing means including a weight 36 is mounted to lower faces of the other ends of the respective second swing links 17 and 17. The first cutting edge 24 is can be moved toward the second cutting edge 25 against the dead load of the weight 35. The weight 35 has its upper face which is capable of being abutted against the lower face of the upper plate 4 of the machine frame 1, so that the weight 35 stops in movement. The second cutting edge 25 is capable of being moved toward the first cutting edge 24 under the dead load of the weight 36. The weight 36 has its lower face which can be abutted against the upper face of the bottom plate 2 of the machine frame 1, so that the weight 36 stops in movement.

A single motor M is mounted to the upper face of the upper plate 4 of the machine frame 1, and serves as a drive unit for rotating the first and second cutting edges 24 and 25 about the vertical axis. The motor M has a motor shaft 37 on which a drive pulley 38 is mounted. The motor M is formed, at its both sides, with a pair of brackets 39 and 39 which are fixedly mounted to the upper face of the upper plate 4 by means of a plurality of bolts 40.

As shown in FIG. 2, a driven pulley 41 is arranged in the rear of the upper gearbox 8 for rotation about a horizontal axis. A belt 42 is stretched between and passes around the drive and driven pulleys 38 and 41. The belt 42 passes through the inserting bore 6 in the upper plate 4. The belt 42 is wound about parts of the outer peripheral surfaces of the respective drive and driven pulleys 38 and 41.

A transmission shaft 43 is rotatably arranged between the front part of the upper gearbox 8 and the rear part of the upper gearbox 18. A transmission shaft 44 is rotatably arranged between the front part of the lower gearbox 9 and the rear part of the lower gearbox 21.

Figure 4:
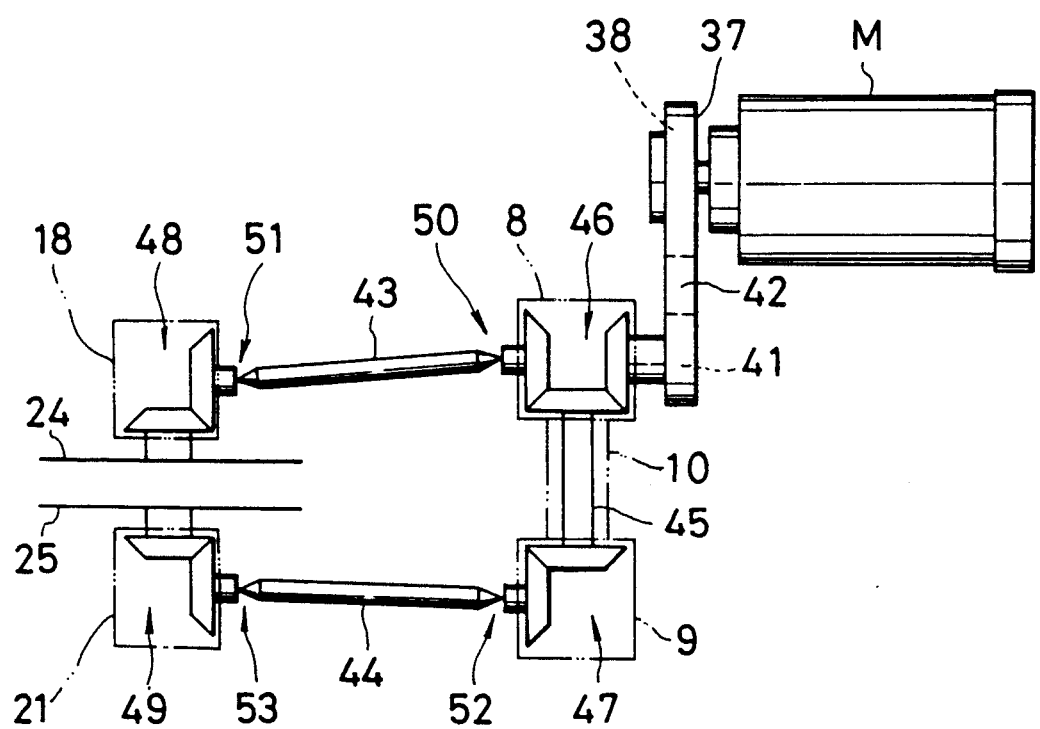
FIG. 4 is a schematic view of a rotation transmitting mechanism illustrated in FIG. 2.

As shown in FIG. 4, a vertical shaft 45 is rotatably arranged within the support pipe 10. A first gear transmission unit 46 is arranged within the upper gearbox 8 for transmitting rotation of the driven pulley 41 to the transmission shaft 43 and to the vertical shaft 45. A second gear transmission unit 47 is arranged within the lower gearbox 9 for transmitting rotation of the vertical shaft 45 to the transmission shaft 44. A third gear transmission unit 48 is arranged within the upper gearbox 18 for transmitting rotation of the transmission shaft 43 to the first cutting edge 24. A fourth gear transmission 49 is arranged within the lower gearbox 21 for transmitting rotation of the transmission shaft 44 to the second cutting edge 25.

The transmission shaft 43 has its one end which is connected to the first gear transmission unit 46 through a universal coupling 50. The other end of the transmission shaft 43 is connected to the third gear transmission unit 48 through a universal coupling 51. The transmission shaft 44 has its one end which is connected to the second gear transmission unit 47 through a universal coupling 52. The other end of the transmission shaft 44 is connected to the fourth gear transmission unit 49 through a universal coupling 53.

The operation of the embodiment will next be described below.

First, when the motor M is driven, the drive pulley 38 is rotated by driving of the motor M. The rotation of the drive pulley 38 causes the driven pulley 41 to be rotated through the belt 42. The rotation of the driven pulley 41 causes the transmission shaft 43 and the vertical shaft 45 to be rotated through the first gear transmission unit 46. The rotation of the vertical shaft 45 causes the transmission shaft 44 to be rotated through the second gear transmission unit 47. The rotation of the transmission shaft 43 causes the first cutting edge 24 to be rotated through the third gear transmission unit 48. Simultaneously, the rotation of the transmission shaft 44 causes the second cutting edge 25 to be rotated through the fourth gear transmission unit 49.

Figure 5:
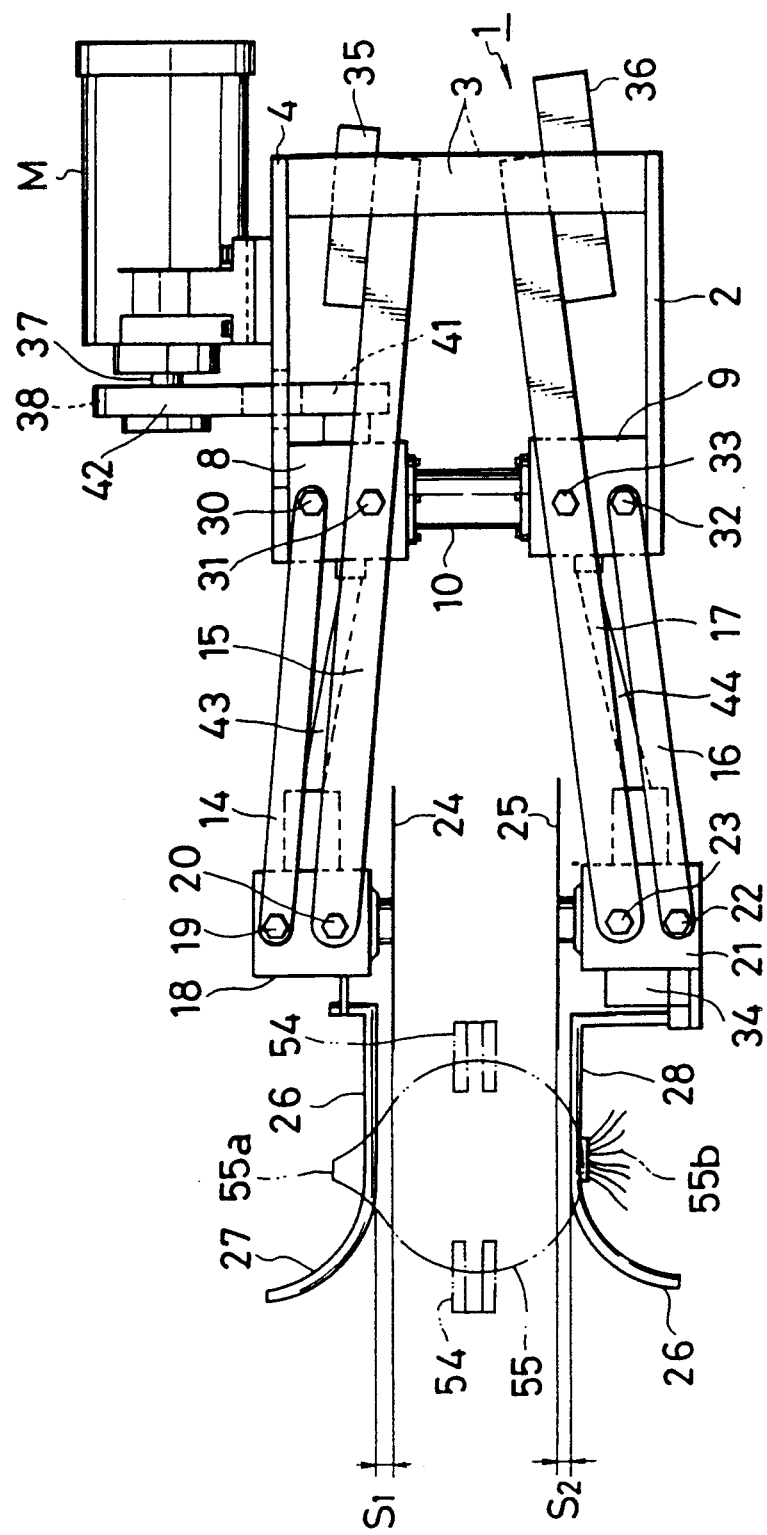
FIG. 5 is a side elevational view showing an operating condition of the embodiment illustrated in FIG. 2.
Figure 6:
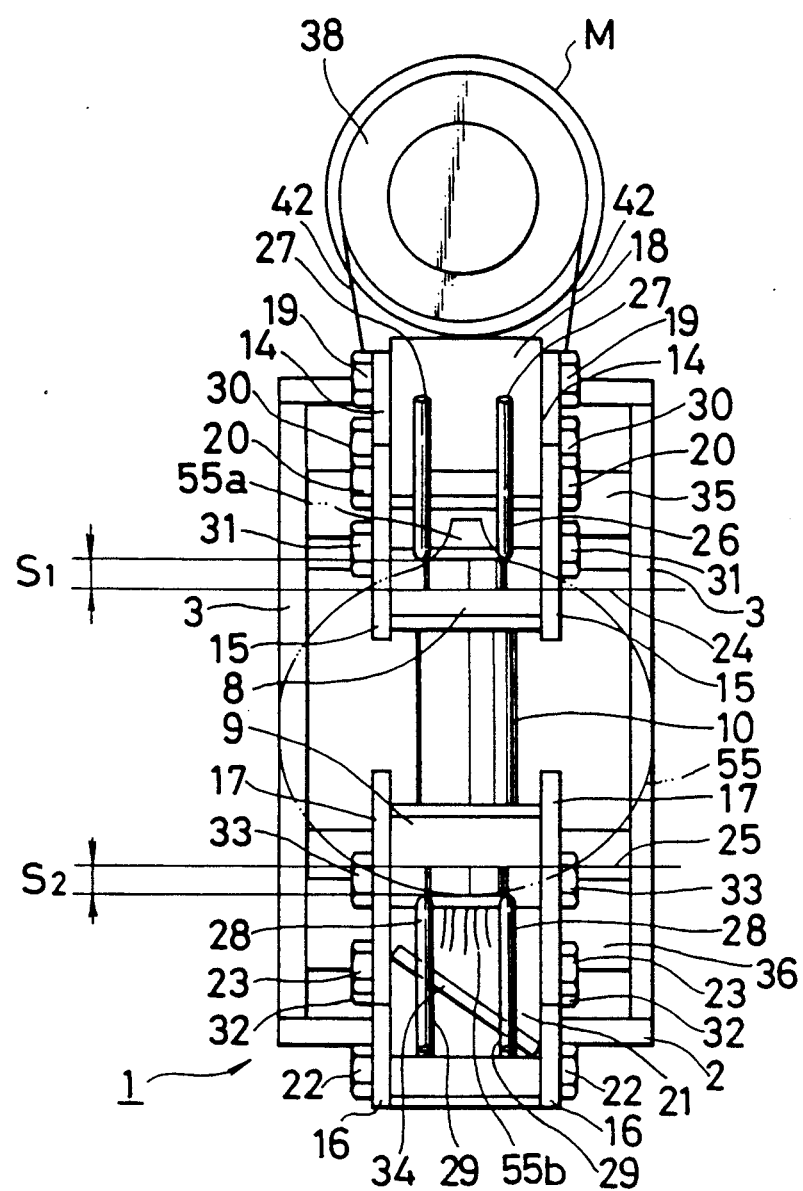
FIG. 6 is an enlarged front elevational view of a principal portion of the embodiment illustrated in FIG. 5.

As shown in FIGS. 5 and 6, a pair of side clamps 54 and 54, which are arranged at the rotary table of the bulb centering clamp apparatus, clamp both sides of an onion 55 at the central position thereof. Under this condition, the rotary table is rotated about the vertical axis, the stem 55a of the onion 55 clamped between the pair of side clamps 54 and 54 is directed upwardly, and the root 55b of the onion 55 is directed downwardly.

Furthermore, when the pair of side clamps 54 and 54 are moved toward a space between the guide rods 26 and 26 and 28 and 28 during the rotation of the rotary table, the bent sections 27 and 27 of the respective guide rods 26 and 26 are abutted against the outer peripheral surface of the onion 55 adjacent the upper end thereof. The bent sections 29 and 29 of the respective guide rods 28 and 28 are abutted against the outer peripheral surface of the onion 55 adjacent the lower end thereof. As shown in FIG. 6, the stem 55a of the onion 55 clamped between the side clamps 54 and 54 enters the space between the guide rods 26 and 26, and the root 55b of the onion 55 enters the space between the guide rods 28 and 28.

Subsequently, the onion 55 clamped between the pair of side clamps 54 and 54 enters the space between the guide rods 26 and 26 and the guide rods 28 and 28 during rotation of the rotary table. At that time, as shown in FIG. 5, the upper gearbox 18 is moved upwardly through the guide rods 26 and 26 during movement of the onion 55. Simultaneously, the first cutting edge 24 is moved upwardly together with the upper gearbox 18, with the cutting plane of the first cutting edge 24 maintained horizontal. The two pairs of first swing links 14 and 14 and 15 and 15 are moved angularly about their respective pivots 30 and 31 under the dead load of the weight 35 during the upward movement of the upper gearbox 18. Simultaneously, the transmission shaft 43 arranged between the upper gearbox 8 and the upper gearbox 18 is moved angularly about the universal couplings 50 and 51 by the upward movement of the upper gearbox 18. Thus, the weight 35 is separated from the lower face of the upper plate 4.

Further, the lower gearbox 21 is moved downwardly through the pair of guide rods 28 and 28 during movement of the onion 55. Simultaneously, the second cutting edge 25 is moved downwardly together with the lower gearbox 21, with the cutting plane of the second cutting edge 25 maintained horizontal. The first and second cutting edges 24 and 25 are moved vertically away from each other in accordance with the dimension and configuration of the onion 55. The two pairs of second swing links 16 and 16 and 17 and 17 are moved angularly about the respective pivots 32 and 33 against the dead load of the weight 36 during the downward movement of the lower gearbox 21. Simultaneously, the transmission shaft 44 arranged between the lower gearbox 9 and the lower gearbox 21 is moved angularly about the universal couplings 52 and 53 by the downward movement of the lower gearbox 21. Thus, the weight 36 is separated from the upper face of the bottom plate 2.

By the movement of the onion 55 located between the guide rods 26 and 26 and between the guide rods 28 and 28 during the rotation of the rotary table, the first cutting edge 24 cuts the stem 55a of the onion 55 by the gap $S_1$ corresponding to the predetermined depth of cut, while the first cutting edge 24 is rotated. Simultaneously, the second cutting edge 25 cuts the root 55b of the onion 55 by the gap $S_2$ corresponding to the predetermined depth of cut, while the second cutting edge 25 is rotated. The root 55b of the onion 55, which is cut off by the second cutting edge 25, falls down along the inclined plate 34.

After the first and second cutting edges 24 and 25 have cut off respectively the stem 55a and the root 55b of the onion 55, the latter passes through the space between the first and second cutting edges 24 and 25 under such a condition that the onion 55 is clamped between the pair of side clamps 54 and 54. At that time, the two pairs of first swing links 14 and 14 and 15 and 15 are moved angularly about the respective pivots 30 and 31 against the dead load of the weight 35. Simultaneously, the upper gearbox 18 is moved downwardly through the two pairs of first swing links 14 and 14 and 15 and 15. The first cutting edge 24 is moved downwardly together with the lower gearbox 18, with the cutting plane of the first cutting edge 24 maintained horizontal. The transmission shaft 43 arranged between the upper gearbox 8 and the upper gearbox 18 is moved angularly about the universal couplings 50 and 51 by the downward movement of the upper gearbox 18. Thus, the weight 35 is abutted against the lower face of the upper plate 4.

Furthermore, the two pairs of second swing links 16 and 16 and 17 and 17 are moved angularly about the respective pivots 32 and 33 under the dead load of the weight 36. The lower gearbox 21 is moved upwardly through the two pairs of second swing links 16 and 16 and 17 and 17. The second cutting edge 25 is moved upwardly together with the upper gearbox 21, with the cutting plane of the second cutting edge 25 maintained horizontal. The transmission shaft 44 extending between the lower gearbox 9 and the lower gearbox 21 is moved angularly about the universal couplings 52 and 53 by the upward movement of the lower gearbox 21. The weight 36 is abutted against the upper face of the bottom plate 2. The first and second cutting edges 24 and 25 are returned to their respective original waiting positions illustrated in FIG. 2 in which the first and second cutting edges 24 and 25 are moved toward each other by the weights 35 and 36.

Furthermore, the onion 55 between the side clamps 54 and 54, in which the stem 55a and the root 55b are cut off from the body of the onion 55, is transported to a bulb-coat peeling-off apparatus (not shown) at the subsequent step, by the rotation of the rotary table.

In connection with the above, if a pair of guides provided respectively at the pair of first and second supports and projecting forwardly therefrom are vertically movable with respect to the pair of first and second supports, it is possible to optionally set the depth of cut between the first cutting edge and the guide and the depth of cut between the second cutting edge and the guide.

What is claimed is:

1. A cutting apparatus for a root and a stem of an onion, characterized by comprising a machine frame, a plurality of first swing links mounted to said machine frame for vertically angular movement, said first swing links being composed of a plurality of link rods extending in parallel relation to each other, a plurality of second swing links mounted to said machine frame for vertically angular movement, said second swing links being composed of a plurality of link rods extending in parallel relation to each other, a first support mounted to one ends of the respective first swing links for angular movement, a second support mounted to one ends of the respective second swing links for angular movement, a first cutting edge arranged at said first support for angular movement, said first cutting edge having a cutting plane maintained horizontal, a second cutting edge arranged at said second support in facing relation to said first cutting edge for angular movement, said second cutting edge having a cutting plane maintained horizontal, a first guide arranged at a front part of said first support and projecting forwardly, a second guide arranged at a front part of said second support and projecting forwardly, biasing means arranged at said second swing links for moving said first and second cutting edges toward each other, and a single drive unit arranged at said machine frame for rotating said first and second cutting edges.

2. The cutting apparatus according to claim 1, wherein each of said first and second swing links includes a plurality of pairs of parallel link rods.

3. The cutting apparatus according to claim 2, wherein said plurality of pairs of parallel link rods of each of said first and second swing links include a plurality of links different in length from each other, and wherein said cutting apparatus further comprises a pair of weights which are provided respectively at ends of the respective longer links opposite respectively to said first and second supports in such a manner that said first and second support are moved toward each other.

4. The cutting apparatus according to claim 1, further comprising a pair of pulleys, an upper gearbox arranged at an upper portion of said machine frame, and a first gear transmission unit arranged within said upper gearbox, wherein said drive unit is connected to said first gear transmission unit through said pair of pulleys.

5. The cutting apparatus according to claim 4, further comprising a lower gearbox and a second gear transmission unit arranged within said lower gearbox, wherein said first gear transmission unit within said upper gearbox is connected to said second gear transmission unit.

6. The cutting apparatus according to claim 1, wherein said first support comprises an upper gearbox, while said second support comprises a lower gearbox.

7. The cutting apparatus according to claim 6, further comprising a first gear transmission unit connected to said drive unit, a first transmission shaft, a pair of first universal joints provided respectively at both ends of said first transmission shaft, a second gear transmission unit arranged within said lower gearbox, a third gear transmission unit arranged within said upper gearbox that is said first support, said first gear transmission unit being connected to said third gear transmission unit through said pair of first universal couplings and said first transmission shaft, a second transmission shaft, a pair of second universal joints provided respectively at both ends of said second transmission shaft, and a fourth gear transmission unit arranged within said lower gearbox that is said second support, said second gear transmission unit is connected to said fourth gear transmission unit through said pair of second universal couplings and said second transmission shaft.

8. The cutting apparatus according to claim 7, wherein said first cutting edge is connected to said third gear transmission unit within said upper gearbox that is said first support, and said second cutting edge is connected to said second gear transmission unit within said lower gearbox that is said second support.

9. The cutting apparatus according to claim 1, further comprising an inclined plate mounted to said second support at a location below said second cutting edge.

10. The cutting apparatus according to claim 5, further comprising a vertical shaft through which said first and second gear transmission units are connected to each other.

11. The cutting apparatus according to claim 10, further comprising a support pipe arranged between said upper and lower gearboxes, said vertical shaft being arranged within said support pipe in concentric relation thereto.

* * * * *